Sept. 25, 1951 M. W. SCHRADER 2,568,828
PISTON ROD ROTATING ATTACHMENT
FOR RECIPROCATING PUMPS
Filed Feb. 24, 1950 2 Sheets-Sheet 1

Inventor
MARTIN W. SCHRADER
By McMorrow, Berman + Davidson
Attorneys

Sept. 25, 1951  M. W. SCHRADER  2,568,828
PISTON ROD ROTATING ATTACHMENT
FOR RECIPROCATING PUMPS
Filed Feb. 24, 1950  2 Sheets-Sheet 2
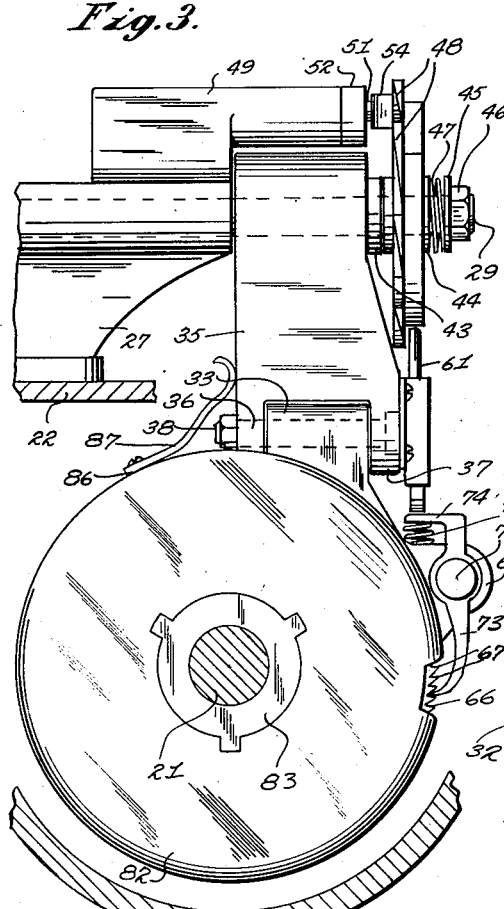
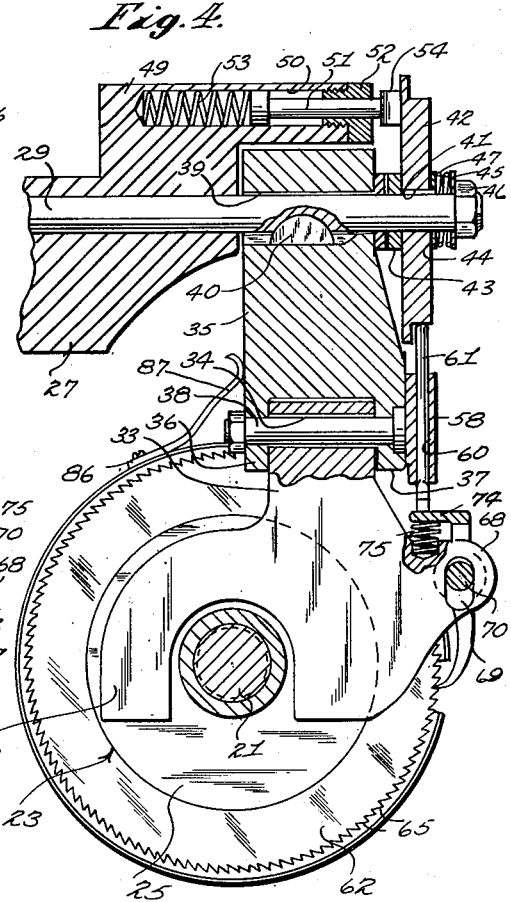
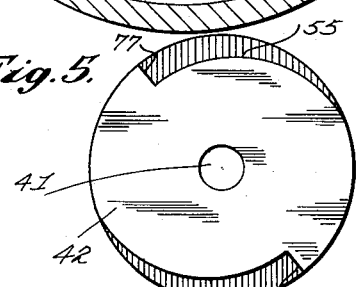
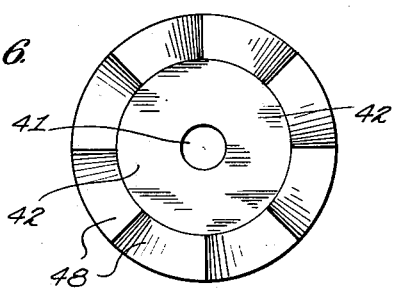
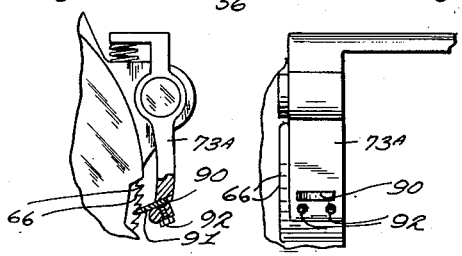
Inventor
MARTIN W. SCHRADER
By McMorrow, Berman & Davidson
Attorney Patented Sept. 25, 1951

2,568,828

UNITED STATES PATENT OFFICE 2,568,828

PISTON ROD ROTATING ATTACHMENT FOR RECIPROCATING PUMPS

Martin W. Schrader, Lafayette, La.

Application February 24, 1950, Serial No. 145,952

4 Claims. (Cl. 121—157)

1

This invention relates to a piston rod rotating attachment for a reciprocating pump, such as a sludge or water pump, for rotating the piston rod or reciprocating shaft of the pump during reciprocation of the rod to reduce wear of the piston rod and the stuffing boxes through which the piston rod extends, and more particularly to an attachment which is operated by the oscillating movements imparted to the pump valve operating shaft by the reciprocating movements of the piston rod to slowly rotate the piston rod during operation of the pump.

It is among the objects of the invention to provide a piston rod rotating assembly for a reciprocating pump which assembly is of simple and durable construction and can be applied to an existing pump with no material modification of the pump construction, which is positive in operation and slowly or gradually rotates the piston rod as the rod is reciprocated during operation of the pump to reduce wear of the piston rod and the stuffing boxes through which the piston rod passes, particularly when the pump is used to pump abrasive material, such as oil well sludge or drilling mud, and which is economical to manufacture and easy to install.

Other objects and advantages will become apparent from a consideration of the following description and the appended claims in conjunction with the accompanying drawings wherein:

Figure 3 is a transverse cross section on an enlarged scale on the line 3—3 of Figure 1;

Figure 4 is a cross section on the line 4—4 of Figure 2;

Figure 5 is an elevation of one face of a cam disc constituting an operative component of the piston rod rotating assembly;

Figure 6 is an elevation of the other face of the cam disc illustrated in Figure 5;

Figure 7 is a side elevational view of the pawl and ratchet mechanism illustrated in Figures 3 and 4 showing a somewhat modified form of ratchet pawl; and

2

Figure 8 is a front elevational view of the modified ratchet mechanism illustrated in Figure 7.

Figure 1:
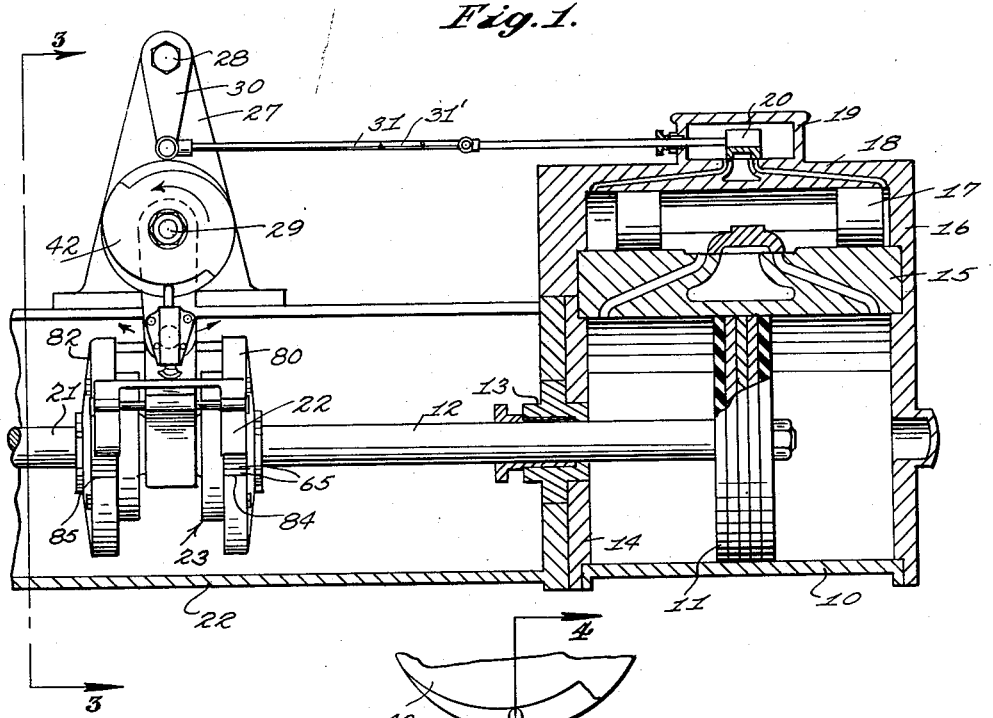
Figure 1 is a longitudinal cross section of a fragmentary portion of a reciprocating pump showing the application of a piston rod rotating assembly illustrative of the invention to the pump.

With continued reference to the drawings, the pump fragmentarily illustrated is a reciprocating steam operated water or sludge pump of well known construction having at one end a steam end, illustrated in cross section in Figure 1 and having at its opposite end a water end, not illustrated. At its steam end the pump has two side-by-side steam cylinders, one of which is illustrated in cross section in Figure 1 and designated at 10. A piston, as indicated at 11, is reciprocable in each steam cylinder and a piston rod 12 is connected at one end to the piston 11 and extends through a stuffing box 13 in the inner end wall 14 of the steam cylinder. A valve port block 15 is included in the side wall of the steam cylinder and a valve chest 16 is provided at the outer side of the port block 15. In the arrangement illustrated a steam operated slide valve 17 reciprocates in the valve chest 16 to control the connection of the steam channels extending through the port block 15 with the steam inlet and steam exhaust connections of the pump and operating steam is supplied to the steam operated valve 17 through an auxiliary port block 18 from an auxiliary steam chest 19 which includes a slide valve 20 mechanically operated from the piston rod 12 of the pump.

Two side-by-side water pistons are provided at the water end of the pump in alignment with the corresponding steam pistons and a piston or swab is reciprocable in each of the water pistons. A piston rod 21 is connected at one end to each water piston or swab and extends through a stuffing box in the inner end of the corresponding water piston, each piston rod 21 being in exact longitudinal alignment with a corresponding piston rod 12. The steam cylinders and water cylinders of the pump are connected together by a hollow pump housing 22 through which the piston rods extend and the water end of the pump is provided with suitable water inlet and outlet connections.

Each of the piston rods is externally screw threaded at its end opposite the piston to which it is connected and the adjacent ends of each two aligned steam and water rod portions are connected by a coupler, generally indicated at 23, having a screw threaded bore into which the screw threaded ends of the two longitudinally aligned piston rods are threaded.

Figure 2:
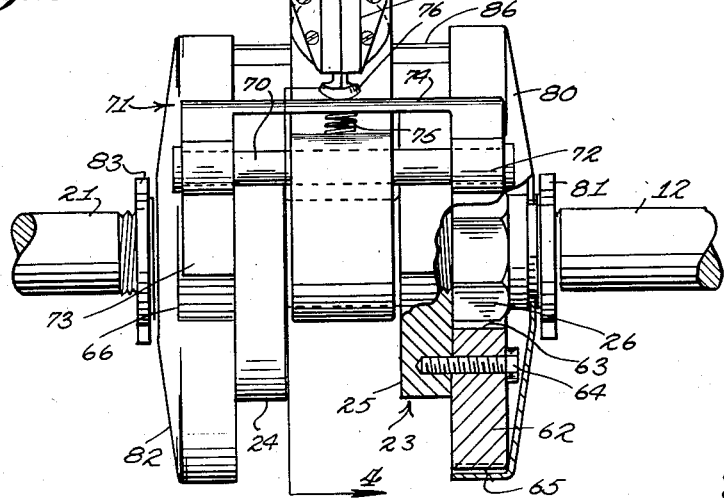
Figure 2 is a side elevation on an enlarged scale of a fragmentary portion of the pump mechanism illustrated in Figure 1 and the piston rod rotating assembly, portions being broken away and shown in cross section to better illustrate the construction thereof.

In the arrangement illustrated the coupler 23 comprises a cylindrical body having a screw threaded bore therethrough and having at its opposite ends cylindrical flanges 24 and 25 which are spaced apart and substantially parallel to each other and have a diameter materially greater than the diameter of that portion of the coupler between the flanges. The piston shafts are locked in operative assembly with the coupler 23 by lock nuts, one of which is illustrated in Figure 2 and indicated at 26, which lock nuts are threaded onto the piston rods and bear against the corresponding ends of the flanged coupler 23.

A saddle 27 is mounted on the pump housing 22 between the steam and water cylinders of the pump and two spaced apart substantially parallel valve operating shafts 28 and 29 are journaled in this saddle with their axes in a plane which is substantially perpendicular to the longitudinal center lines or axes of the two piston rod and coupler assemblies. An arm 30 is secured at one end to each valve operating shaft at one end of the latter, the arm connected to shaft 28 being designated at 30, and valve links 31 and 31' connect the distal ends of these arms respectively to the corresponding slide valves.

It will be noted that the valve shafts extend transversely across the pump so that a valve shaft operated by one steam piston operates the valve of the other steam piston and vice versa.

Means, as particularly illustrated in Figures 3 and 4, are provided for connecting each of the valve operating shafts to the corresponding piston rod and coupler assembly and, in the illustrated arrangement, this means includes a fork or yoke 32 received between the flanges 23 and 24 of the associated coupler 23 and having in one end a notch in which the intermediate portion of the coupler is received. A lug 33 having an aperture or bolt hole 34 extending therethrough is formed on the yoke 32 and an oscillating arm 35 is provided at one end with two spaced apart apertured lugs 36 and 37 between which the lug 33 of the yoke is received, and a pivot pin or bolt 38 extends through the aligned apertures or bolt holes in the lugs 33, 36 and 37 to pivotally interconnect the yoke 32 at one end to the adjacent end of the arm 35. The pivotal axis of the pin or bolt 38 is substantially in a plane which is perpendicular to the common longitudinal center line or axis of the corresponding piston rod and coupler assembly so that the arm 35 can swing as the piston rod and coupler assembly reciprocates without swinging or tilting the yoke 32.

Near its opposite end the arm 35 is provided with a hole or aperture 39 through which the corresponding valve actuating shaft 29 extends and the arm is drivingly connected to the shaft by suitable means such as the key 40 seated in a key recess in the shaft and engaged in a key slot in the arm.

With this arrangement the valve operating shaft 29 will be oscillated by reciprocation of the associated piston rod and coupler assembly and will in turn oscillate the arm corresponding to the arm 30 connected thereto at its end opposite the arm 35 and will operate the corresponding slide valve through the associated valve link.

As the pump construction is well known, a more detailed illustration and description thereof is considered unnecessary for the purposes of the present disclosure.

In accordance with the present invention the valve operating shaft 29 is extended somewhat outwardly of the associated oscillating arm 35 and this outwardly extending portion of the valve operating shaft is received in the central aperture 41 of a circular cam disc 42. A friction washer 43 surrounds the shaft 29 between the arm 35 and the disc 42 and is fixed on the shaft. A bearing washer 44 surrounds the shaft 29 at the opposite or outer side of the cam disc and an abutment washer 45 is secured on the shaft in spaced relationship to the washer 44 by a nut 46 threaded onto the screw threaded end of the shaft. A compression spring 47 between the bearing washer 44 and the abutment washer 45 resiliently holds the cam disc against the friction washer 43 so that the cam disc will tend to oscillate with the shaft 29 but the shaft can move relative to the cam disc if the cam disc is held against rotational movement.

The cam disc is provided on its face adjacent the arm 35 with an annular series of contiguous ratchet teeth 48 and a housing 49 having a bore 50 therein is mounted on the saddle 27 and extends across the end of the arm 35 at which the arm is connected to the shaft 29. A plunger 51 is slidably mounted in the bore 50 and extends outwardly of the bore through an apertured nut 52 threaded into the open end of the bore adjacent the cam disc 42 and a compression spring 53 disposed in the bore 50 between the end of the plunger 51 within the bore and the closed end of the bore urges the plunger 51 outwardly of the housing 49. A pawl or dog 54 on the outer end of the plunger 51 engages the ratchet teeth 48 on the cam disc to hold the cam disc against rotation in one direction.

With this arrangement, as the shaft 29 oscillates the cam disc will be progressively rotated in one direction since movement with the shaft 29 in the opposite direction is precluded by engagement of the pawl 54 with the ratchet teeth of the cam disc, the friction clutch slipping and permitting the shaft 29 to move relative to the cam disc during this other or opposite oscillatory movement of the shaft.

The ratchet teeth may be provided on a peripheral surface of the disc 42 and engaged by a dog operating radially of the disc, if desired, without in any way exceeding the scope of the invention.

The cam disc 42 is provided in its periphery with one or more cam surfaces, the illustrated arrangement including two diametrically opposed spiral cam surfaces 55 and 56 each of which extends through an arc somewhat greater than 90 degrees. A flanged guide 58 is secured to the arm 35 over the head of the pivot bolt 38 by suitable means such as the screws 59 extending through apertures in the guide flange and threaded into tapped holes provided in the arm 35. This guide has a longitudinal bore 60 which is substantially centered longitudinally on the pivotal axis of the pin 38.

A plunger 61 is slidably mounted in the bore 60 of the guide 58 and has one end in contact with the cam surfaces.

A ratchet disc 62 has a central aperture 63 receiving the lock nut 26 on the piston rod 12 and this disc is disposed against the outer side of the flange 25 and rigidly secured to this flange by cap screws 64 which extend through apertures in the disc and are threaded into tapped holes in the flange. The disc 62 is substantially coaxial with the shaft 12 and is provided on its periphery with an annular series of contiguous ratchet teeth 65.

A similar ratchet disc 66 surrounds the lock nut on shaft 21 and is disposed against the outer end of coupler flange 24. This ratchet disc 66 is secured to the flange 24 by cap screws, similar to the screws 64, extending through apertures in the ratchet disc and threaded into tapped holes in the coupler flange. The disc 66 is substantially coaxial with the shaft 21 and is provided in its peripheral surface with an annular series of contiguous ratchet teeth 67.

The yoke 32 is provided on the side thereof corresponding to the adjacent end of shaft 29 with an extension 68 having therethrough an opening 69 which is elongated in the direction of the length of the plunger 61. A shaft 70 extends through the opening 69 in the yoke extension 68 and has its opposite ends disposed at the outer sides of the ratchet discs 62 and 66.

A pawl formation, generally indicated at 71, is mounted on the shaft 70 and includes a pawl 72 having intermediate its length a cylindrical formation receiving the corresponding end of the shaft 70 and a pawl 73 also having intermediate its length a hollow cylindrical formation receiving the other end of the shaft 70. The pawl 72 has one end tapered in thickness and curved to provide an edge engaging with the ratchet teeth 65 of the disc 62 and the pawl 73 has its corresponding end tapered in thickness and curved to provide an edge engaging the ratchet teeth 67 of the disc 66. A bridge formation 74 connects the two ends of the pawls 72 and 73 opposite the ratchet tooth engaging ends of the pawls and a compression spring 75 is interposed between this bridge formation and the extension 68 on the yoke 32. The plunger 61 is provided on its end opposite the cam disc 42 with a curved rocker formation 76 which engages the side of the bridge formation 74 opposite the spring 75.

With this arrangement, as the cam disc 44 is progressively rotated in the manner indicated above, the plunger 61 is forced in a direction away from the shaft 29 and exerts pressure on the pawl formation 71 also moving this pawl formation in a direction away from the shaft 29 and compressing the spring 75. By reason of the engagement of the pawls 72 and 73 with the teeth of the ratchet discs 62 and 66 these discs are rotated rotating the assembly including the piston rods 12 and 21 and the coupler 23. The cam disc is provided at one end of each cam surface with radial shoulders 77 and 78 and, when one of these shoulders passes the end of plunger 61 in engagement with the cam surfaces as the cam disc rotates, pressure on the plunger 61 is relieved and the spring 75 moves the plunger and pawl formation 71 in a direction toward the shaft 29 thereby engaging the pawls with successive ratchet teeth on the associated ratchet discs 62 and 66.

The piston rods are thus progressively rotated during operation of the pump to reduce wear of the piston rods and the stuffing boxes through which they pass.

The illustrated arrangement is such that it requires eight reciprocatory cycles of the piston rod and coupler assembly to rotate the cam disc 42 through one complete rotation. This means that the ratchet discs 62 and 66 will be moved one tooth for each four reciprocatory cycles of the piston rod and coupler assembly. As there are a large number of ratchet teeth on each ratchet disc, the rotation of the piston rods, while substantially continuous, is very slow in comparison to the operating speed of the pump so that no appreciable amount of additional wear is introduced by the rotation of the piston rods.

As the rotation of the piston rods also rotates the pistons in the corresponding cylinders, the wear between the pistons and cylinders or cylinder liners will also be materially reduced.

The outer side and periphery of the ratchet disc 62 is enclosed in a sheet metal shield 80. This shield has a central aperture surrounding the shaft 12 and the wall of the shield around this central aperture is rotatably received in an annular groove in a nut 81 which is threaded onto the screw threaded portion of the shaft 12 adjacent the lock nut 26. The periphery and outer surface of the ratchet disc 66 is similarly enclosed in a sheet metal shield 82 rotatably mounted on a nut 83 which is threaded onto the screw threaded portion of the piston rod 21. The shield 80 is provided in its annular portion with a recess 84 and a similar recess 85 is provided in the annular portion of the shield 82, these recesses providing openings through which the ratchet tooth engaging ends of the dogs or pawls 72 and 73 extend to engage the teeth on the ratchet discs 62 and 66. In order to maintain the openings 84 and 85 in registry with the tooth engaging ends of the pawls 72 and 73, the shields 80 and 82 must be held against rotation with the piston rods 12 and 21 and this may be conveniently accomplished by extending a bar 86 across the space between the two shields 80 and 82, connecting one end of the bar 86 to the annular portion of the shield 80 and the other end of the bar to the annular portion of the shield 83, providing a finger 87 extending from the bar 86 into engagement with the side of the oscillating arm 35 opposite that to which the guide 58 is secured.

It will be noted that the tooth engaging ends of the pawls 72 and 73 are substantially in alignment with the line of thrust of the plunger 61 so that pressure of the plunger on the pitch formation 74 will move the entire pawl assembly and the shaft 70 to rotate the ratchet discs 62 and 66 rather than moving the tooth engaging ends of the pawls out of engagement with the ratchet teeth. The spring 75 resiliently maintains the pawls in engagement with the ratchet teeth but permits the pawls to ratchet over the teeth on the return stroke of the pawl formation, as described above.

While the rod rotating device has been illustrated and hereinabove described in association with a duplex or two-cylinder pump, it is to be understood that it can be applied to a single-cylinder reciprocating pump or to a pump having three or more cylinders without in any way exceeding the scope of the invention.

In the modified arrangement illustrated in Figures 7 and 8 the ratchet pawl 73a is thickened at its lower end and provided with an inclined slot 90 near the thickened lower end and with tapped holes leading from the lower end of the pawl into the slot 90. A flat bit 91 of specially hardened material is disposed in the slot 90 and has a sharpened end engaging the ratchet teeth 66 and set screws 92 extend through the tapped holes in the pawl and engage the bit 91 to hold the bit in adjusted position in the pawl.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a reciprocating pump having a reciprocatory piston rod, an oscillatory valve operating shaft and means connecting said valve operating shaft to said piston rod, means mounted on said means connecting said valve operating shaft and said piston rod and drivenly connected to said valve operating shaft and drivenly connected to said piston rod to rotate the piston rod as said valve operating shaft is oscillated by reciprocatory movements of said piston rod.

2. In a reciprocating pump having a reciprocatory piston rod, an oscillatory valve operating shaft, and means connecting said valve operating shaft to said piston rod for oscillating said shaft upon reciprocation of said rod, piston rod rotating means mounted on said means connecting said valve operating shaft and piston rod and drivenly connected to said valve operating shaft and drivingly connected to said piston rod to rotate said piston rod as said valve operating shaft is oscillated by reciprocatory movements of said piston rod, said piston rod rotating means comprising a cam mounted on said valve operating shaft, a ratchet disc mounted on said piston rod, and a pawl operated by said cam and engaging said ratchet disc.

3. In a reciprocating pump having a reciprocating piston rod, an oscillating valve operating shaft, and means connecting said valve operating shaft to said piston rod to oscillate said shaft upon reciprocating movement of said rod, piston rod rotating means mounted on said means connecting said valve operating shaft and piston rod and drivenly connected to said valve operating shaft and drivingly connected to said piston rod to rotate the piston rod as said valve operating shaft is oscillated by reciprocatory movements of said piston rod, said piston rod rotating means comprising a cam mounted on said valve operating shaft, a friction drive connection between said shaft and said cam, means engaging said cam and precluding rotation of the latter in one direction so that said cam is progressively rotated by oscillatory movement of said shaft, a ratchet disc drivingly connected to said piston rod, a pawl supported adjacent said ratchet disc and engaging the ratchet teeth of the latter, means interposed between said cam and said pawl periodically moving said pawl in a ratchet disc rotating direction upon rotation of said cam, and resilient means engaging said pawl and resiliently urging the latter in the opposite direction.

4. In a reciprocating pump having a reciprocatory piston rod, an oscillatory valve operating shaft, and means connecting said valve operating shaft to said piston rod, piston rod rotating means mounted on said means connecting said valve operating shaft and piston rod and drivenly connected to said valve operating shaft and drivingly connected to said piston rod to rotate the latter as said valve operating shaft is oscillated by reciprocatory movement of said piston rod, said piston rod rotating means comprising a cam mounted on said valve operating shaft, a friction drive connection between said shaft and said cam, means engaging said cam and precluding rotation of the latter in one direction so that said cam is progressively rotated in the same direction by oscillatory movements of said shaft, a ratchet disc drivingly connected to said piston rod, a pawl supported adjacent said ratchet disc and engaging the ratchet teeth thereof, a guide supported between said cam and said pawl, a plunger slidably mounted in said guide and bearing at one end against said cam and at its other end against said pawl to periodically move said pawl in a ratchet disc rotating direction, said cam having a radial shoulder freeing said plunger for movement of said pawl in the opposite direction at a predetermined rotational position of said cam relative to said plunger, and resilient means engaging said pawl and resiliently urging it in the opposite direction.

MARTIN W. SCHRADER.

REFERENCES CITED

The following references are of record in the file of this patent:

UNITED STATES PATENTS

| Number | Name | Date |
|---|---|---|
| 831,822 | Boocock | Sept. 25, 1906 |
| 1,283,675 | Coleman | Nov. 5, 1918 |